US012766526B2

(12) United States Patent
Piramoon

(10) Patent No.: US 12,766,526 B2
(45) Date of Patent: Oct. 20, 2026

(54) BATCH BIOPROCESSING CENTRIFUGE ROTOR

(71) Applicant: Fiberlite Centrifuge LLC, Santa Clara, CA (US)

(72) Inventor: Sina Piramoon, San Jose, CA (US)

(73) Assignee: Fiberlite Centrifuge LLC, Santa Clara, CA (US)

( * ) Notice: Subject to any disclaimer, the term of this patent is extended or adjusted under 35 U.S.C. 154(b) by 995 days.

(21) Appl. No.: 17/905,027

(22) PCT Filed: Jun. 8, 2021

(86) PCT No.: PCT/US2021/036348
§ 371 (c)(1),
(2) Date: Aug. 25, 2022

(87) PCT Pub. No.: WO2021/252456
PCT Pub. Date: Dec. 16, 2021

(65) Prior Publication Data
US 2023/0086155 A1 Mar. 23, 2023

Related U.S. Application Data

(60) Provisional application No. 63/036,582, filed on Jun. 9, 2020.

(51) Int. Cl.
*B04B 5/04* (2006.01)
*B04B 7/02* (2006.01)
*B04B 7/08* (2006.01)

(52) U.S. Cl.
CPC .......... *B04B 5/0414* (2013.01); *B04B 5/0428* (2013.01); *B04B 7/02* (2013.01);
(Continued)

(58) Field of Classification Search
CPC ....... B04B 5/0414; B04B 5/0428; B04B 7/02; B04B 7/085; B04B 2005/0435; B04B 2007/025; B04B 5/0407; B04B 7/08
(Continued)

(56) References Cited

U.S. PATENT DOCUMENTS 4,295,601 A 10/1981 Cowell
4,944,721 A * 7/1990 Carson ...................... B04B 7/02
494/85
(Continued)

FOREIGN PATENT DOCUMENTS

CN 211935695 U * 11/2020
JP 5463279 U 5/1979
(Continued)

OTHER PUBLICATIONS

European Patent Office, International Search Report and Written Opinion of the International Searching Authority, International Application No. PCT/US2021/036348, mailed Sep. 14, 2021 (14 pages).

*Primary Examiner* — Claire X Wang
*Assistant Examiner* — Shuyi S. Liu
(74) *Attorney, Agent, or Firm* — BakerHostetler

(57) ABSTRACT

A rotor for use in a centrifuge, and adapters for coupling one or more processing containers to the rotor. The rotor includes a rotor body having a plurality of receptacles each configured to receive an adapter. Each adapter includes an outer surface configured to interface with one of the receptacles, and one or more cavities each configured to accept a processing container. The rotor may also include a rotor liner positioned between the adapters and the rotor body. The rotor liner engages the receptacles of the rotor body, and
(Continued)

provides a plurality of receptacles that receive the adapters, thereby providing an interface between the adapters and the receptacles of the rotor body.

42 Claims, 8 Drawing Sheets

(52) U.S. Cl.
CPC ...... *B04B 7/085* (2013.01); *B04B 2005/0435* (2013.01); *B04B 2007/025* (2013.01)

(58) Field of Classification Search
USPC .......................................... 494/16, 21, 45, 64
See application file for complete search history.

(56) References Cited

U.S. PATENT DOCUMENTS

| | | | | |
|---|---|---|---|---|
| 8,215,508 | B2 | 7/2012 | Baird et al. | |
| 8,323,169 | B2 | 12/2012 | Piramoon | |
| 10,086,383 | B2 | 10/2018 | Piramoon | |
| 2011/0085950 | A1* | 4/2011 | Lee | G01N 35/00029 422/537 |
| 2012/0100979 | A1* | 4/2012 | Chin | B04B 7/06 494/12 |
| 2018/0361401 | A1* | 12/2018 | Piramoon | B04B 5/0414 |

FOREIGN PATENT DOCUMENTS

| | | | | |
|---|---|---|---|---|
| JP | 2018103143 | A | 7/2018 | |
| WO | 03000380 | A1 | 1/2003 | |
| WO | WO-2005030398 | A2 * | 4/2005 | B04B 5/0428 |
| WO | 2019166998 | A1 | 9/2019 | |

* cited by examiner

BATCH BIOPROCESSING CENTRIFUGE ROTOR

CROSS-REFERENCE TO RELATED APPLICATIONS

The present application is a U.S. National Stage entry under 35 U.S.C. § 371 of, and claims priority to, International Application No. PCT/US2021/036348, filed Jun. 8, 2021, which claims the filing benefit of U.S. Provisional Application Ser. No. 63/036,582, filed Jun. 9, 2020, the disclosures of which are hereby incorporated herein by reference in their entireties.

TECHNICAL FIELD

The present invention relates generally to centrifuge rotors and, more particularly, to a rotor configured for batch processing of biological suspensions in a centrifuge.

BACKGROUND

Bioreactors and fermenters are used to grow biological suspensions that include cells or microorganisms suspended in a liquid medium. Once a biological suspension has been sufficiently grown, it is typically separated into liquid and solid components. The separated components are then harvested for subsequent analysis or use. Centrifugation is a common technique for separating biological components, such as cells, organelles, and biopolymers, including proteins, nucleic acids, lipids, and carbohydrates dispersed in biological suspension.

Centrifugation typically involves dispensing quantities of a suspension from a bioreactor or fermenter into a processing container, such as a bottle or a bag. The container is then closed and spun in a centrifuge. The centrifugal force created by spinning a rotor in the centrifuge causes the solids in the suspension to settle out and form a generally solid pellet toward the bottom of the container. A supernatant comprising liquid that is less dense than the pellet collects in the container above the pellet. Once the supernatant and pellet have formed, the supernatant is decanted by pouring or pumping the supernatant out of the container. The pellet can then be separately removed from the container.

Conventional centrifugation processes have a number of shortcomings. For example, in order to increase throughput, it is typically desirable for the containers to hold as much suspension as possible. However, as the size of the container is increased, it becomes more difficult for an operator to place containers in and remove containers from the centrifuge. Increasing the number of containers which are loaded into the centrifuge can also increase throughput. However, having a large number of containers also increases the amount of time it takes the operator to load and unload each batch of containers from the centrifuge.

Another problem with centrifugation is how to separate the supernatant from the pellet without disturbing the concentration of previously suspended particles in the pellet. This problem can be exacerbated if the containers are large or otherwise difficult to remove from the centrifuge due to increased jostling of the container, which can cause portions of the pellet to become resuspended in the supernatant.

Thus, there is a need for improved methods and systems for centrifugation of biological suspensions.

SUMMARY

The present invention overcomes the foregoing and other shortcomings and drawbacks of centrifuge rotors heretofore known for use for centrifugation of biological suspensions. While the present invention will be discussed in connection with certain embodiments, it will be understood that the present invention is not limited to the specific embodiments described herein.

In an embodiment of the present invention, a rotor for a centrifuge is provided. The rotor includes a rotor body having a plurality of receptacles spaced circumferentially about an axis of rotation of the rotor body, and a plurality of adapters. Each of the receptacles of the rotor body may be defined by a circumferential sidewall of the rotor body, a centrally located torque transfer ring, and a respective pair of circumferentially spaced torque transfer members extending between the torque transfer ring and the circumferential sidewall of the rotor body. Each adapter may be removably supported within a respective one of the plurality of receptacles of the rotor body and each adapter may be configured to receive a respective processing container within the adapter.

In an aspect of the present invention, each of the adapters and each of the receptacles of the rotor body may be configured so that the adapter is insertable into and removable from a respective receptacle of the rotor body in an axial direction.

In another aspect of the present invention, the rotor may further include a rotor liner having a plurality of circumferentially spaced receptacles, and each receptacle of the rotor liner may be configured to be located within a respective one of the plurality of receptacles of the rotor body.

In another aspect of the present invention, each of the adapters and each of the receptacles of the rotor liner may be configured so that the adapter is insertable into and removable from a respective receptacle of the rotor liner in an axial direction.

In another aspect of the present invention, the rotor liner may further include a plurality of circumferentially spaced pockets each located between an adjacent pair of the plurality of receptacles of the rotor liner.

In another aspect of the present invention, each of the plurality of torque transfer members may be located within a respective one of the plurality of pockets of the rotor liner.

In another aspect of the present invention, at least one of the plurality of torque transfer members may be located within at least one of the plurality of pockets of the rotor liner.

In another aspect of the present invention, each of the plurality of receptacles of the rotor liner may be wedge shaped.

In another aspect of the present invention, the rotor may further include a carbon fiber reinforcement provided about the circumferential sidewall of the rotor body.

In another aspect of the present invention, each of the plurality of torque transfer members may include a radially-aligned rib and an axially-aligned rib.

In another aspect of the present invention, each of the plurality of axially-aligned ribs may include a first arcuate taper having a wide end and a narrow end, and each axially-aligned rib may be joined to a radially inwardly-facing surface of the circumferential sidewall by the wide end of the first arcuate taper.

In another aspect of the present invention, each of the plurality of radially-aligned ribs may extend from a radially outwardly-facing surface of the torque transfer ring to a respective one of the plurality of axially-aligned ribs.

In another aspect of the present invention, the rotor body may include a base having an upper surface, and each of the plurality of radially-aligned ribs may extend upwardly from the upper surface of the base.

In another aspect of the present invention, each of the plurality of radially-aligned ribs may include a second arcuate taper having a wide end and a narrow end, and each radially-aligned rib may be joined to the upper surface of the base by the wide end of the second arcuate taper.

In another aspect of the present invention, each of the plurality of adapters may include an outer wall, an inner opening, a pair of opposite sidewalls, a top wall, and a bottom wall that define an open-faced cavity configured to receive the respective processing container within the adapter.

In another aspect of the present invention, a circumferential length of the outer wall may be greater than the circumferential length of the inner opening.

In another aspect of the present invention, each of the adapters may be wedged shaped.

In another aspect of the present invention, the rotor may further include at least one processing container received within a respective adapter.

In another aspect of the present invention, the processing container may include one of a biobag or a processing bottle.

In another aspect of the present invention, each of the plurality of adapters may be generally rectangular shaped and include two oppositely and circumferentially extending lobes.

In another aspect of the present invention, each adapter may further include at least one horizontally oriented cavity configured to receive a processing container within the cavity.

In another aspect of the present invention, each adapter may include a handle configured to provide a grip that facilitates placing the adapter into one of the plurality of receptacles of the rotor body.

In another aspect of the present invention, the handle may project upwardly from the adapter.

In another aspect of the present invention, the rotor may further include a lid having a bottom surface with a plurality of cavities each configured to accommodate one of the adapter handles.

In another embodiment of the present invention, another rotor for a centrifuge is provided that includes a rotor body defining a plurality of first receptacles spaced circumferentially about an axis of rotation of the rotor body.

In an aspect of the present invention, the rotor may further include a plurality of adapters each configured to receive a processing container and to engage a respective first receptacle so that each adapter is held in place within the rotor by the respective first receptacle.

In another aspect of the present invention, each of the adapters and the receptacles may be configured so that the adapter is inserted into and removed from a respective receptacle in an axial direction.

In another aspect of the present invention, the rotor may further include a rotor liner including a plurality of second receptacles placed circumferentially about the axis of rotation of the rotor body, and each second receptacle may be configured to be received by a respective one of the first receptacles.

In another aspect of the present invention, each adapter may be configured to engage a respective second receptacle so that each adapter is held in place within the rotor by the respective second receptacle.

In another aspect of the present invention, the rotor body may include a base having an upper surface and a plurality of radially-aligned ribs extending upward from the upper surface of the base.

In another aspect of the present invention, the radially-aligned ribs may at least partially define the receptacles.

In another aspect of the present invention, the rotor may further include a rotor liner having a plurality of pockets each configured to engage a respective radially-aligned rib of the rotor body.

In another aspect of the present invention, the rotor body may include a circumferential sidewall having an radially inwardly-facing surface and a plurality of axially-aligned ribs extending inwardly from the radially inwardly-facing surface of the circumferential sidewall, and each pair of circumferentially adjacent axially-aligned ribs may at least partially define one of the receptacles.

In another aspect of the present invention, the axially-aligned ribs may include a first arcuate taper having a wide end and a narrow end, and are joined to the radially inwardly-facing surface of the circumferential sidewall by the wide end of the first arcuate taper.

In another aspect of the present invention, the rotor body may include a torque transfer ring symmetrically disposed about the axis of rotation and having a radially outwardly-facing surface, and a plurality of radially-aligned ribs extending from the radially outwardly-facing surface of the torque transfer ring to the radially inwardly-facing surface of the circumferential sidewall.

In another aspect of the invention, the rotor body may include a base having an upper surface and the radially-aligned ribs may extend upward from the upper surface of the base.

In another aspect of the present invention, the radially-aligned ribs may have a second arcuate taper, and are joined to the upper surface of the base by a wide end of the second arcuate taper.

In another embodiment of the present invention, an adapter for operatively coupling a processing container to a centrifuge rotor having a plurality of receptacles is provided. The adapter includes a body configured to be received by a respective one of the plurality of receptacles of the centrifuge rotor, and a cavity configured to receive the processing container.

In an aspect of the present invention, the body of the adapter may include an outer wall, a first sidewall, a second sidewall opposite the first sidewall, a top wall, and a bottom wall opposite the top wall.

In another aspect of the present invention, the outer wall, the first sidewall, the second sidewall, the top wall, and the bottom wall may be operatively coupled together to define an inner opening opposite the outer wall that provides access to the cavity.

In another aspect of the present invention, the first sidewall and the second sidewall may have a radial length such that, when the adapter is placed in the receptacle, the inner opening is offset radially toward the outer wall from an inner wall of the receptacle.

In another aspect of the present invention, the first sidewall and the second sidewall of the adapter may be oriented at an angle that, when multiplied by the number of receptacles in the centrifuge rotor, equals 360 degrees.

In another aspect of the present invention, the angle between the first sidewall and the second sidewall of the adapter may provide the adapter with a wedge shape.

In another aspect of the present invention, the top wall and the bottom wall of the adapter may be parallel to each other.

In another aspect of the present invention, the outer wall of the adapter may include a radially inwardly-facing surface having an axially-aligned curved taper.

In another aspect of the present invention, the axially-aligned curved taper may be provided by a progressively increasing thickness of the outer wall as the outer wall extends from the bottom wall to the top wall.

In another aspect of the present invention, the receptacle may be provided by a rotor liner of the centrifuge rotor.

In another aspect of the present invention, the processing container may be a biobag.

In another aspect of the present invention, the adapter may include a handle configured to provide a grip that facilitates placing the adapter into one of the plurality of receptacles of the rotor body.

In another aspect of the invention, the handle may project upwardly from the adapter.

In another aspect of the present invention, the cavity of the adapter may be one of a plurality cavities each configured to receive one of a plurality of processing containers.

In another aspect of the present invention, the cavity of the adapter may face radially inward.

In another aspect of the present invention, the cavity of the adapter may be oriented in a horizontal direction.

In another aspect of the present invention, each receptacle of the rotor may be at least partially defined by a plurality of axially-aligned ribs, and the body of the adapter may include a plurality of opposing and circumferentially extending lobes that engage the axially-aligned ribs.

In another aspect of the present invention, each of the axially-aligned ribs may have an arcuate taper, and each lobe may have a radius of curvature that matches the radius of curvature of the arcuate taper of the axially-aligned ribs.

In another embodiment of the present invention, another adapter for operatively coupling a processing container to a centrifuge rotor is presented. The adapter includes a plurality of walls that define an open-faced cavity configured to receive the processing container. The plurality of walls includes an outer wall opposite an inner opening of the adapter, and the outer wall includes a radially inwardly-facing surface having an axially-aligned curved taper.

In an aspect of the present invention, the plurality of walls may further include a top wall and a bottom wall, and the axially-aligned curved taper may be provided by a progressively increasing thickness of the outer wall as the outer wall extends from the bottom wall to the top wall.

In another aspect of the present invention, the axially-aligned curved taper may work in conjunction with centrifugal force generated by rotating the centrifuge rotor to cause suspended solids to collect in a portion of the processing container proximate the bottom wall.

In another aspect of the present invention, the adapter may further include a handle operatively coupled to the top wall of the adapter.

In another aspect of the present invention the handle may project upwardly from the top wall of the adapter.

BRIEF DESCRIPTION OF THE DRAWINGS

The accompanying drawings, which are incorporated in and constitute a part of this specification, illustrate certain embodiments of the present invention and, together with a general description of the invention given above, and the detailed description given below, serve to explain the invention.

DETAILED DESCRIPTION

Figure 1:
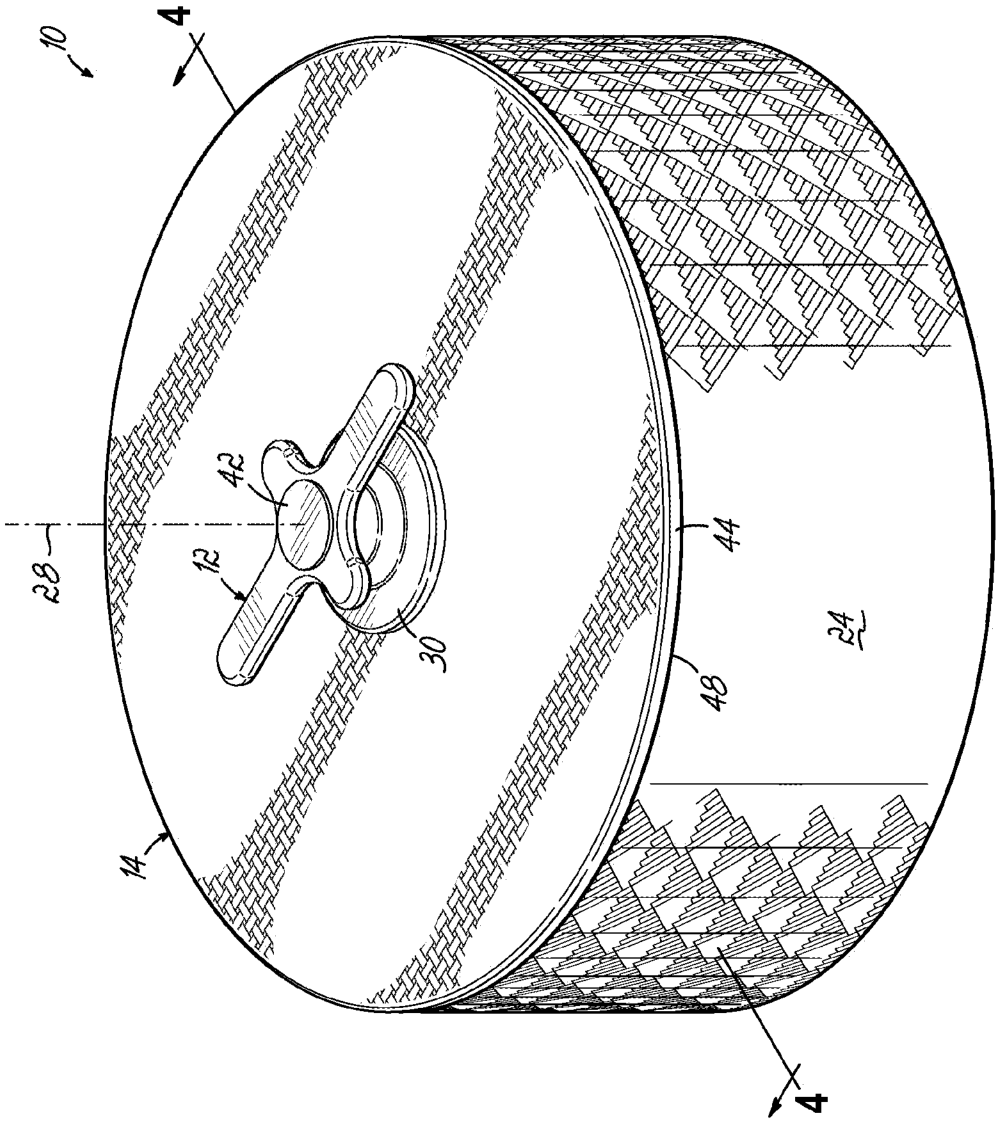
FIG. 1 is a perspective view of a centrifuge rotor in accordance with an embodiment of the present invention.

Embodiments of the present invention are directed to rotors for batch processing of biological suspensions using processing containers in the form of biobags and processing bottles.

Referring to FIGS. 1-4A, a rotor 10 according to an exemplary embodiment of the present invention includes a lid handle 12, a lid 14, a drive hub 16, a plurality of adapters 18, a rotor liner 20, a rotor body 22, a reinforcement 24, and a retaining nut 26, each concentrically located about an axis of rotation 28. Each component of the rotor 10 may be arranged symmetrically about the axis of rotation 28 so that rotation of the rotor 10 does not produce a significant amount of centrifugal force or couple, i.e., so that the rotor 10 is dynamically balanced about the axis of rotation 28.

Figure 4:
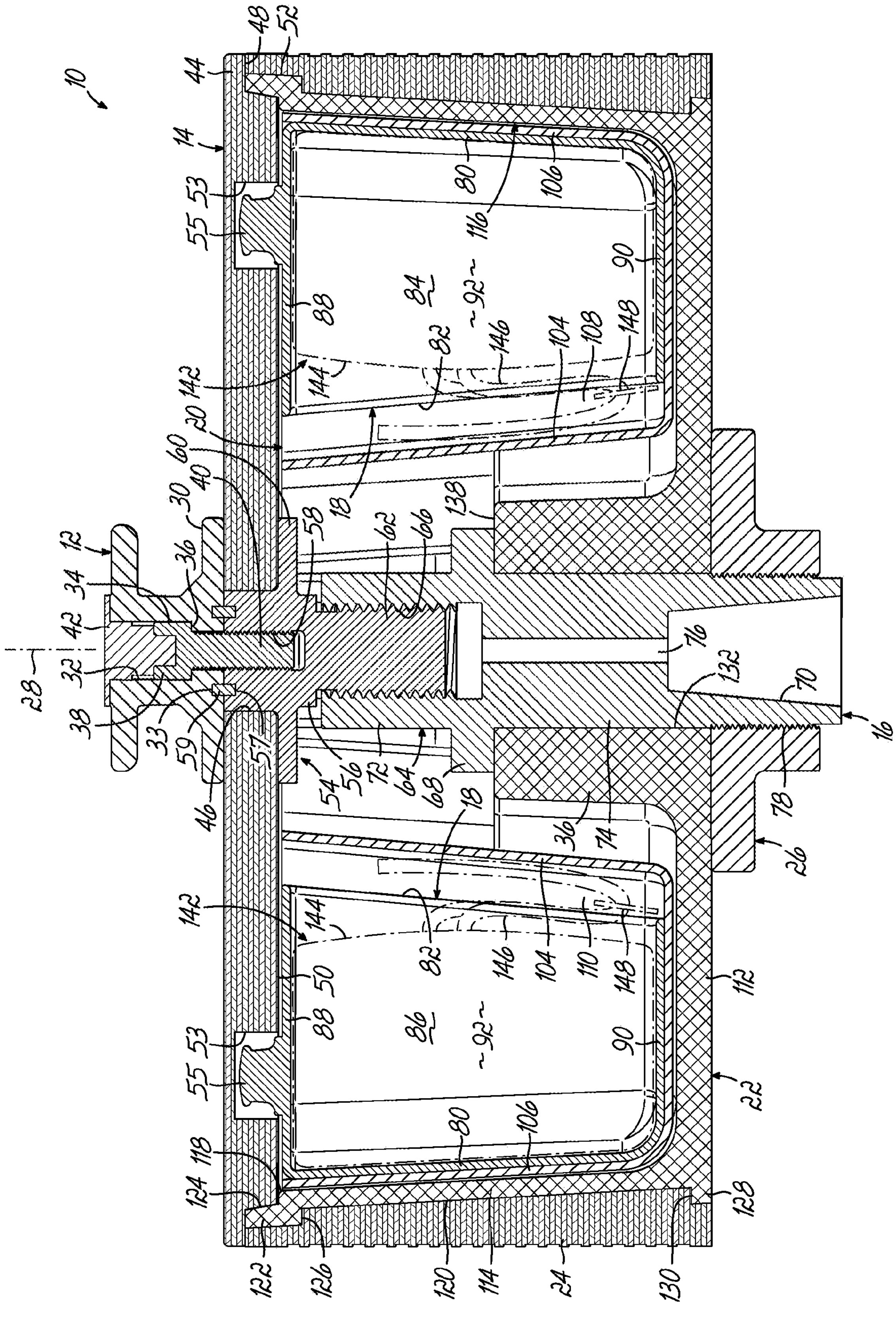
FIG. 4 is a cross-sectional view taken along line 4-4 of the centrifuge rotor of FIG. 1 in accordance with an embodiment of the present invention.
Figure 4A:
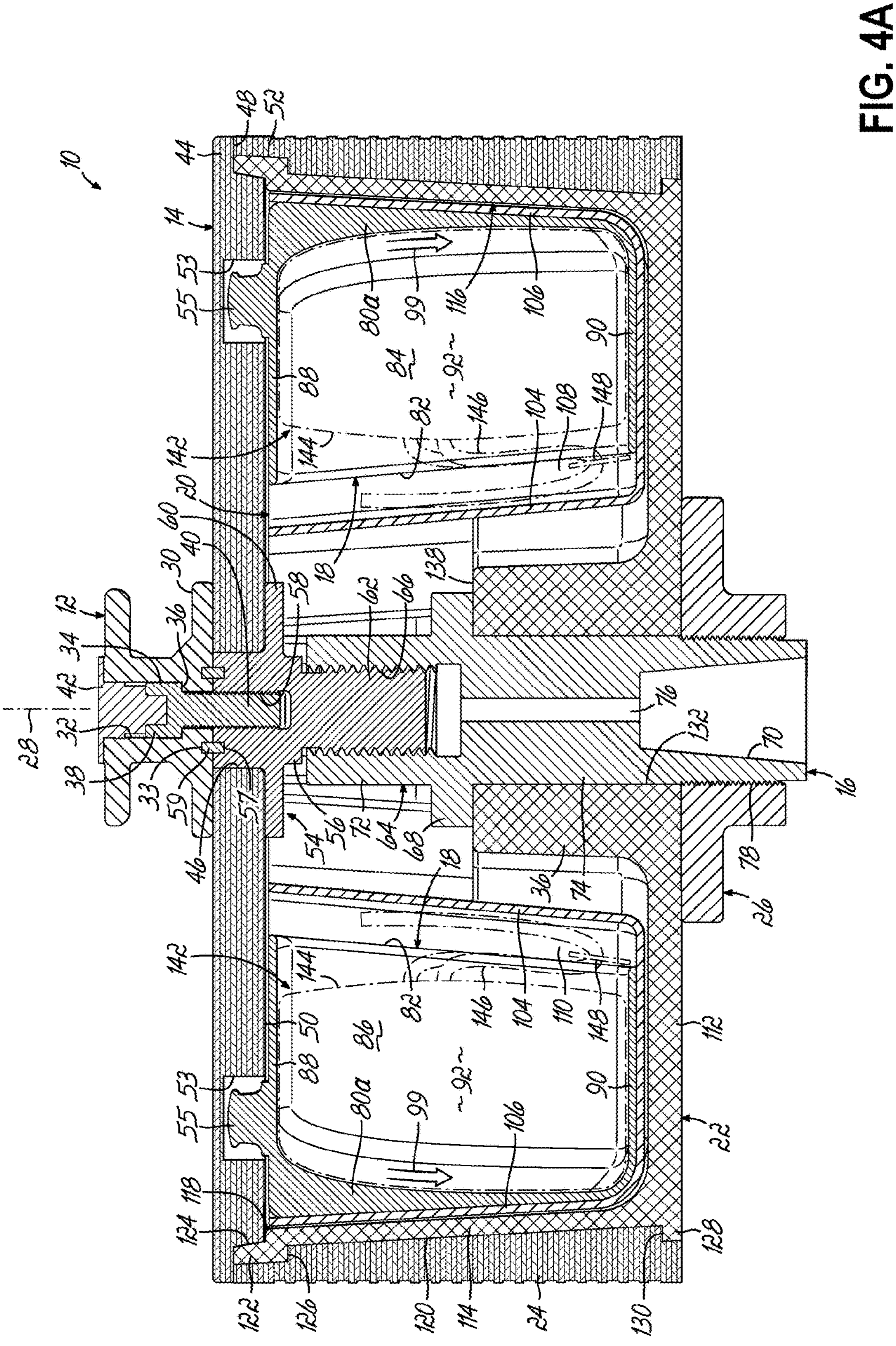
FIG. 4A is a cross-sectional view taken along line 4-4 of the centrifuge rotor of FIG. 1 in accordance with another embodiment of the present invention.

The lid handle 12 includes a handle flange 30 that projects radially outward from a lower portion of the lid handle 12. The lid handle 12 may provide a grip that facilitates lifting the rotor 10 in a substantially axial (e.g., vertical) direction, such as when inserting the rotor 10 into, or removing the rotor 10 from, a centrifuge. As best shown by FIGS. 4 and 4A, the lid handle 12 includes a handle bore 32 centered on the axis of rotation 28 and configured to receive a clamp screw 34. The handle bore 32 includes top and bottom openings and a bore shoulder 36 that narrows the diameter of the handle bore 32 at a point located between the top and bottom openings.

The clamp screw 34 includes a head 38 configured to engage the bore shoulder 36 when inserted into the top opening of handle bore 32. The bore shoulder 36 may be positioned along the length of the handle bore 32 such that, when the head 38 of clamp screw 34 engages the bore shoulder 36, a threaded portion 40 of clamp screw 34 extends from the bottom opening of handle bore 32. A plug 42 may be inserted into a top opening of the handle bore 32. The plug 42 may be configured to prevent the clamp screw 34 from rotating relative to the lid handle 12 so that twisting the lid handle 12 causes the clamp screw 34 to rotate with the lid handle 12. The plug 42 may also prevent the clamp screw 34 from falling out of the handle bore 32 when the lid handle 12 is removed from the lid 14.

The lid 14 includes a lid flange 44 along the perimeter thereof, and a center hole 46 centered on the axis of rotation 28. A bottom surface 48 of lid flange 44 is connected to a bottom surface 50 of lid 14 by a bevel 52. The bottom surface 50 of lid 14 may include a plurality of cavities 53 each configured to accommodate an adapter handle 55. The center hole 46 may be configured to receive a clamp screw retainer 54. The clamp screw retainer 54 includes a cylindrical body 56 axially centered on the axis of rotation 28, a threaded bore 58 axially-aligned and centered in the cylindrical body 56, a clamp screw retainer flange 60 that projects radially outward from the cylindrical body 56, and a threaded rod 62 that projects downward from the cylindrical body 56. The cylindrical body 56 may further include one or more pin holes 57 each configured to accept a pin 59. The pins 59 may engage corresponding pin holes 33 in the lid handle 12, thereby preventing the lid handle 12 from rotating relative to the retainer 54 when the lid handle 12 is fastened to the retainer 54 by clamp screw 34.

The cylindrical body 56 of clamp screw retainer 54 may have a diameter the same as or slightly less than the diameter of the center hole 46 of lid 14. The clamp screw retainer 54 may thereby position the lid 14 about the axis of rotation 28. The threaded bore 58 of clamp screw retainer 54 is configured to threadedly engage the threaded portion 40 of clamp screw 34. In response to the lid handle 12 being rotated relative to the clamp screw retainer 54, the threaded portion 40 of clamp screw 34 may be drawn into, or urged out of, the threaded bore 58 of clamp screw retainer 54, depending on the direction of rotation. When the clamp screw 34 is tightened, the head 38 thereof presses against the bore shoulder 36 to provide an axial compressive force that secures the lid 14 between the handle flange 30 and the clamp screw retainer flange 60.

The drive hub 16 includes a cylindrical body 64 centered on and aligned with the axis of rotation 28, a threaded bore 66 axially-aligned and centered in the cylindrical body 64, a drive hub flange 68 that projects radially outward from the cylindrical body 64, and a tapered bore 70 configured to receive a spindle of the centrifuge. The drive hub flange 68 may generally divide the cylindrical body 64 of drive hub 16 into an upper portion 72 and a lower portion 74. The threaded bore 66 and tapered bore 70 may be connected by a passage 76. The lower portion 74 of cylindrical body 64 includes threads 78 on a portion of its outer surface configured to threadedly engage the retaining nut 26.

Each adapter 18 is configured to receive a processing container 142, e.g., a biobag. Each adapter 18 may be made of various materials such as cut carbon fibers in an epoxy matrix, or 20% glass fiber fill in a polypropylene matrix. Each adapter 18 may include an adapter body 79 comprising an outer wall 80, an inner opening 82, sidewalls 84, 86, a top wall 88, and a bottom wall 90. Each sidewall 84, 86 may join a respective axially-aligned edge of the outer wall 80 to a respective axially-aligned edge of the inner opening 82. The sidewalls 84, 86 of adapter 18 may oriented at an angle e in the radial dimension. In an embodiment of the present invention, the angle $\theta \approx 360/N$, where N is the number of adapters 18 that can be held by the rotor liner 20.

The angle θ at which the sidewalls 84, 86 of adapter 18 are oriented may give the adapter 18 a wedge shape. This wedge shape may result in the circumferential length of the outer wall 80 being larger than the circumferential length of the inner opening 82, with the difference in circumferential length having an inverse relationship to the radial distance between the outer wall 80 and the inner opening 82. The top wall 88 and bottom wall 90 may be generally parallel to each other, have a wedge shape, and join respective edges of the outer wall 80, inner opening 82, and sidewalls 84, 86 to define an open-faced cavity 92 configured to receive a processing container.

The radial length of the sidewalls 84, 86 may be such that the inner opening 82 is offset radially toward the outer wall 80 from an inner wall 104 of the rotor liner 20. This offset may provide space for fluid lines, clamps, manifolds, or other attachments to the processing containers between the adapter 18 and the rotor liner 20. The fluid lines and other components may be used to add a suspension to the processing container before centrifuging, and remove supernatant or pellet material from the processing container after centrifuging.

Advantageously, enabling supernatant or pellet material to be removed without removing the processing container from the adapter 18 may reduce the amount of pellet that becomes resuspended in the supernatant due to movement of the processing container. Processing containers may be inserted into and removed from the cavity 92 of adapter 18 through the inner opening 82. Insertion of the processing container into the adapter 18 may occur before or after the suspension has been added to the processing container, and removal of the processing container from the adapter 18 may occur before or after removal of one or both of the processed components of the suspension.

Figure 2:
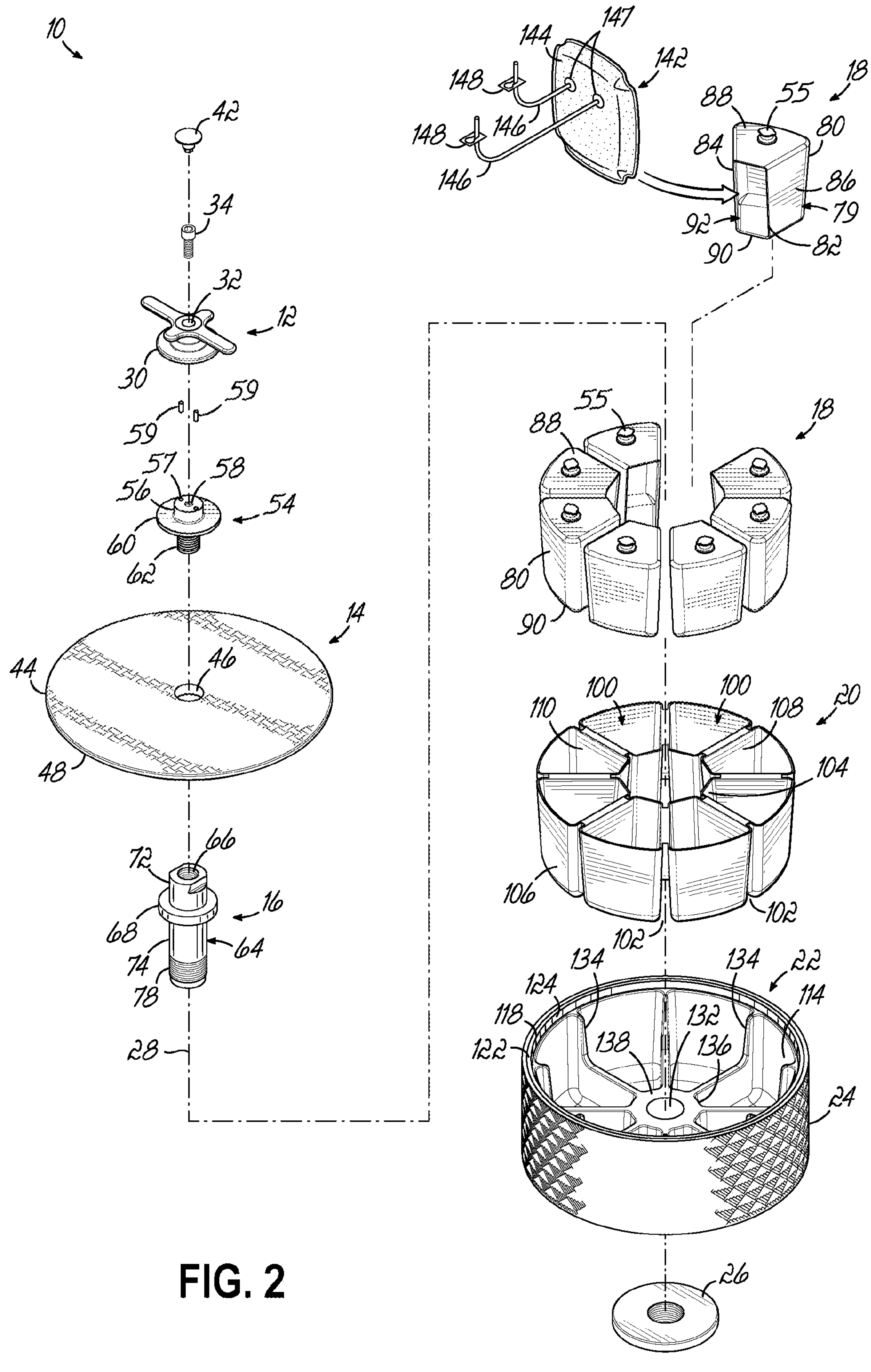
FIG. 2 is a partially disassembled perspective view of the centrifuge rotor of FIG. 1.
Figure 3:
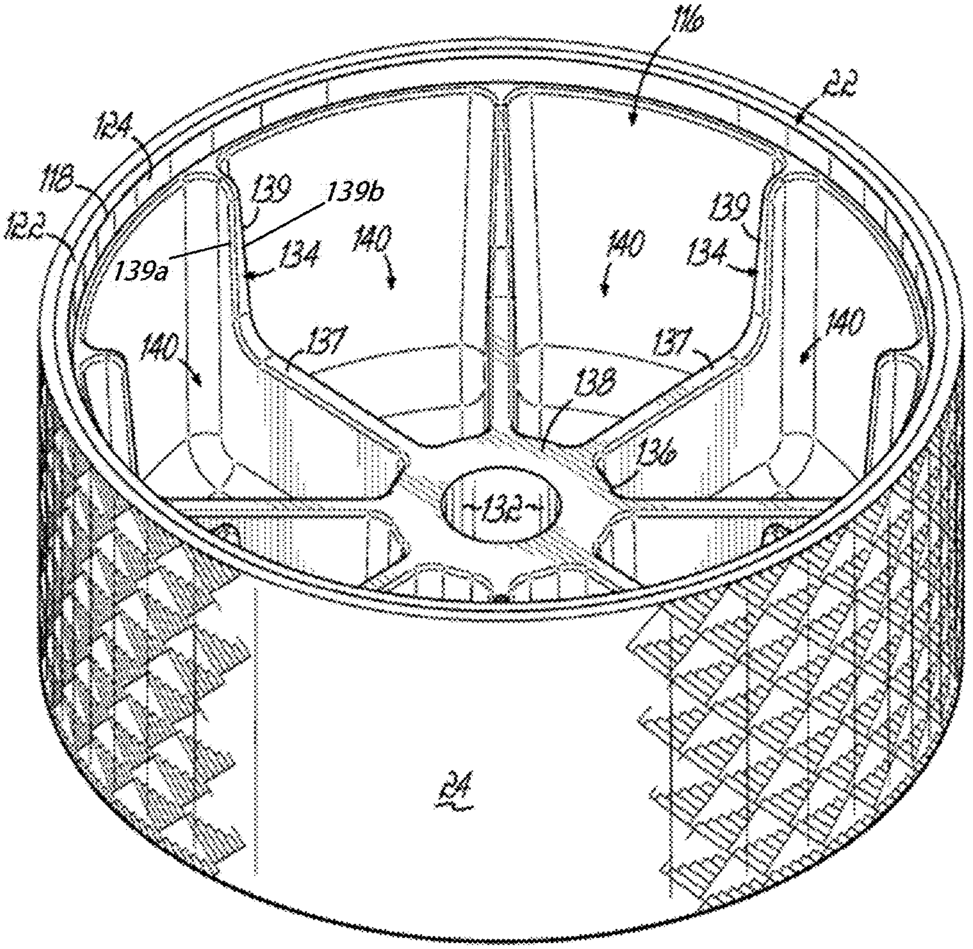
FIG. 3 is a perspective view of a body of the centrifuge rotor of FIGS. 1 and 2.

As best shown by FIG. 2, the outer wall 80 may have a curved shape as viewed from the top that generally corresponds to the radial distance of the wall from the axis of rotation 28 when the adapter 18 is seated in the rotor liner 20. As best shown by FIG. 4, the radially inwardly-facing surface of outer wall 80 may be generally straight in the axial direction. In an alternative embodiment of the present invention shown by FIG. 4A, the radially inwardly-facing surface of outer wall 80 may include an axially-aligned curved taper 80*a*. The curved taper 80*a* may be provided by a progressively increasing thickness of the outer wall 80 as the outer wall extends from the bottom wall 90 toward the top wall 88. Advantageously, the curved taper 80*a* may cause suspended solids to collect toward the bottom wall 90 during centrifugation, as indicated by arrow 99. This may facilitate both decanting of the supernatant without resuspending a portion of the pellet, as well as harvesting of the pellet.

Sidewalls 84, 86, top wall 88, and bottom wall 90 may be generally flat. The adapter handle 55 may project upwardly from the adapter body 79. In particular, the adapter handle 55 may be located on the top wall 88. The adapter handle 55 may thereby provide a grip that facilitates placing adapters 18 into and removing adapters 18 from the rotor liner 20. As shown in FIGS. 4 and 4A, the bottom surface 50 of lid 14 includes the circumferentially spaced cavities 53 to accommodate the handles 55 of adapter 18. Processing containers may be one-time use containers that are sealed before being placed in the rotor liner 20, thereby eliminating the need to clean the rotor 10 after centrifugation.

The rotor liner 20 may include a plurality of (e.g., eight) receptacles 100 each configured to hold an adapter 18. Each receptacle 100 may be spaced from its neighboring receptacles 100 by a distance sufficient to provide a pocket 102 between each pair of adjoining receptacles 100. Each receptacle 100 may be configured to receive and secure an adapter 18 placed in the rotor 10 using an axial motion. Enabling the adapter 18 to be inserted and removed from the rotor liner 20 without having to tilt the adapter 18 relative to the axis of rotation 28 may reduce the amount of resuspension of the pellet due to jostling of the processing container after centrifuging. The use of receptacles 100 to secure each adapter 18 may also allow the rotor 10 to be operated with less than a full load of processing containers so long as the mass of the adapters 18 and their contents is evenly distributed relative to the axis of rotation 28. For example, two of eight, four of eight, or six of eight receptacles 100 may be occupied by adapters 18, with each adapter 18 positioned opposite of a corresponding adapter 18, and the remaining receptacles 100 being empty. Each receptacle 100 may include the inner wall 104, an outer wall 106, and two sidewalls 108, 110, and have a wedge shape. The sidewalls 108, 110 of each receptacle 100 may extend in a radial direction. The inner and outer walls 104, 106 may be curved so that each of their surfaces are a respective fixed distance from the axis of rotation 28.

The rotor body 22 includes a generally circular base 112 and a circumferential sidewall 114 that define a chamber 116 having an upward-facing opening 118. The sidewall 114 includes a radially outwardly-facing surface 120 and a rim 122. The rim 122 may define a perimeter of the opening 118 and include a radially inwardly-facing surface 124 configured to engage the bevel 52 of lid 14. The bevel 52 of lid 14 and radially inwardly-facing surface 124 of rim 122 may thereby operate cooperatively to seal the chamber 116 when the lid 14 is coupled to the rotor 10. The seal between the lid 14 and rotor body 22 may contain any leakage from the processing containers within the rotor body 22, thereby reducing both the potential for contamination of the samples and introduction of biological materials into the workspace of the centrifuge operator.

The rim 122 may project outward from the sidewall 114 to form an upper shoulder 126 on the radially outwardly-facing surface 120 of sidewall 114. A ridge 128 that projects outward from the radially outwardly-facing surface 120 of sidewall 114 may provide a lower shoulder 130 positioned proximate to a bottom edge of sidewall 114. The upper and lower shoulders 126, 130 may prevent axial movement of reinforcement 24.

The rotor body 22 includes a center hole 132 in the base 112 thereof, and a plurality of torque transfer members 134. The center hole 132 of rotor body 22 may be configured to receive the lower portion of drive hub 16. A torque transfer ring 136 having the same inner diameter as the center hole 132 projects upward from the base 112 of rotor body 22. The torque transfer ring 136 includes a top surface 138 configured to engage a bottom surface of drive hub flange 68 so that the rotor body 22 is securely fastened to the drive hub 16 when the retaining nut 26 is threadedly engaged with the threads 78 of the lower portion 74 of drive hub 16.

The torque transfer members 134 may operate to transfer torque transmitted through the torque transfer ring 136 from the spindle of the centrifuge to the rotor liner 20. The torque transfer members 134 may be integral with the rotor body 22 such that the base 112, sidewall 114, torque transfer members 134, and torque transfer ring 136 are formed from a single piece of material, e.g., using a molding process. Each torque transfer member 134 of rotor body 22 may extend radially from a radially outwardly-facing surface of the torque transfer ring 136 to a radially inwardly-facing surface of sidewall 114. Although the exemplary embodiments of the rotor 10 depict eight torque transfer members 134, the present invention is not limited to a particular number of torque transfer members 134. For example, rotor 10 may have between two and twelve torque transfer members 134. However, it should be understood that there is no fixed upper limit on the number of torque transfer members 134 that may be included in the rotor 10.

The torque transfer members 134 each include a radially-aligned rib 137 that projects upward from the base 112, and an axially-aligned rib 139 that projects radially inward toward the axis of rotation 28 from the radially inwardly-facing surface of sidewall 114 to reinforce the rotor body 22. An axially-aligned rib can include a first arcuate taper 139*a* having a wide end and a narrow end; an axially-aligned rib can also include a second arcuate taper 139*b* having a wide end and a narrow end. The radially-aligned ribs 137 and axially-aligned ribs 139 may each include a taper that reduces their circumferential width along the axial dimension toward the opening 118. This taper may provide a close fit between the rotor liner 20 and receptacle 100, thereby reducing or eliminating lateral movement of the rotor liner 20 within the rotor body 22. The taper may also facilitate removal of the rotor body 22 from a mold for embodiments in which the rotor body 22 is injection molded, and may have an angle of 10 degrees or more.

The radially-aligned ribs 137 may include an arcuate taper having a wide end and a narrow end, and may be joined to an upper surface of the base 112 by the wide end of the taper. The axially-aligned ribs 139 may also include an arcuate taper having a wide end and a narrow end, and may be joined to the radially inwardly-facing surface of sidewall 114 by the wide end of the taper. The arcuate tapers of the radially and axially-aligned ribs 137, 139 may provide a smooth transition between the torque transfer members 134 and the adjoining surfaces of the rotor body 22. Torque transfer members and rings are described in detail by U.S. Pat. No. 10,086,383, issued Oct. 2, 2018, the disclosure of which is incorporated by reference herein in its entirety.

The torque transfer members 134 define a plurality of circumferentially-spaced receptacles 140 each configured to accept a corresponding receptacle 100 of rotor liner 20. The torque transfer members 134 may thereby engage the rotor liner 20 so as to prevent the rotor liner 20 from rotating relative to the rotor body 22. This may allow rotational forces applied to the rotor 10 through the drive hub 16 and torque transfer ring 136 to be transferred to the rotor liner 20 without significant movement of the rotor liner 20 relative to the rotor body 22.

To this end, the torque transfer members 134 may be configured to fit into or otherwise engage the pockets 102 between receptacles 100 of rotor liner 20 when the rotor liner 20 is placed into the rotor body 22. In an embodiment of the present invention, the number of torque transfer members 134 may match the number of receptacles 100 so that one torque transfer member 134 extends between each receptacle 100 of rotor liner 20 when the rotor liner 20 is placed into the rotor body 22. In another embodiment of the present invention, there may be fewer torque transfer members 134 than receptacles 100. In this case, torque transfer members 134 may only extend into some of the pockets 102 of rotor liner 20 when the rotor liner 20 is placed into the rotor body 22, e.g., every other pocket 102, every third pocket 102 (e.g., for a rotor having six receptacles), every fourth pocket 102, etc.

For embodiments having a fewer number of torque transfer members 134 than pockets 102, the rotor body 22 may include "passive" radially and axially-aligned ribs located between torque transfer members 134. These passive ribs may be configured to engaged empty pockets 102 and help secure the rotor liner 20 within the rotor body 22, but may lack the structural rigidity of the torque transfer members 134 necessary to transfer torque from the torque transfer ring 136 to the rest of the rotor body 22. The use of passive ribs may thereby reduce the total mass of the rotor 10.

By way of example, in an embodiment, half of the circumferentially spaced ribs 137, 139 (e.g., four ribs) may comprise torque transfer members 134 arranged circumferentially spaced 90 degrees from each other, with the remaining ribs 137, 139 only providing a supporting function located midway between each pair of adjacent torque transfer members 134. In another embodiment, all of the circumferentially spaced ribs 137, 139 may only serve to support the rotor liner 20. In this embodiment, torque transfer members that transfer torque from the drive hub 16 to the circumferential sidewall 114 may be located below the base 112 of rotor body 22.

The rotor body 22 may comprise a carbon fiber reinforced composite material including one or more layers of a carbon fiber laminate in a binding material. One or more layers of the carbon fiber laminate (e.g., the layers comprising the base 112 of rotor body 22) may be rotated relative to the layer immediately below so that the carbon fibers run at an angle compared to those in adjacent layers, e.g., a 45 degrees angle. One or more of the carbon fiber layers (e.g., the layers comprising the torque transfer members 134) may be configured so that at least some of the fibers are oriented lengthwise radially from the torque transfer ring 136 to the sidewall 114 of rotor body 22. These radially-aligned fibers may increase the ability of the rotor body 22 to withstand centrifugal forces. The binding material may be a polymer, such as a thermoset resin (e.g., an epoxy), a polyester, a vinyl ester, nylon, or any other suitable binding material. The rotor body 22 may also be compression molded from layers of resin-coated carbon fiber material.

The rotor liner 20 may be bonded to the rotor body 22 of rotor 10 or removably attached to the rotor body 22. Removably attached rotor liners 20 may have a friction-fit with the rotor body 22 that enables the rotor liner 20 to be removed, e.g., for cleaning. The rotor liner 20 may be formed from a rigid material, such as a composite material including carbon fibers. The rotor liner 20 may be manufactured using injection molding, additive manufacturing (e.g., 3D printing), or any other suitable process.

The radially inwardly-facing surface of sidewall 114 and the torque transfer members 134 of rotor body 22 may oppose loads caused by acceleration of the receptacles 100 during centrifugation. Each receptacle 100 may thereby be independently supported within the rotor 10 by the base 112, sidewall 114, and a pair of circumferentially adjacent torque transfer members 134 of rotor body 22. In an embodiment of the present invention, the rotor 10 may be rotated at a top speed of between 5,000 and 6,000 Rotations Per Minute (RPM), and produce a centripetal acceleration in the processing container of about 10,000 times that of Earth's gravity.

The reinforcement 24 may include one or more helical windings that extend around the sidewall 114 of rotor body 22, and may be formed by a filament winding process followed a by compression molding process using a suitable material, such as an epoxy-coated carbon fiber. For example, the reinforcement 24 may be compression molded onto the rotor body 22 after placing layers of resin-coated carbon fiber laminate material, or winding one or more strands of carbon fiber, onto the radially outwardly-facing surface of sidewall 114. The reinforcement 24 may be configured to bear the majority of the centrifugal forces placed on the rotor 10. Methods of forming reinforcements for centrifugal rotors using a filament winding process are described in detail by U.S. Pat. No. 8,323,169, issued Dec. 4, 2012, the disclosure of which incorporated by reference herein in its entirety.

The retaining nut 26 threadedly engages the threads 78 of the lower portion 74 of drive hub 16 to provide an axial compressive force that presses the lid 14 against one or more of the adapters 18, the rotor liner 20, rotor body 22, and reinforcement 24. The lid handle 12, drive hub 16, retaining nut 26, clamp screw 34, plug 42, clamp screw retainer 54, pins 59 may be made from metal (e.g., 316 stainless steel) or other suitable material.

Processing containers 142 in the form of biobags may include a flexible collapsible bag 144 that defines a compartment for receiving a suspension, and one or more (e.g., two) fluid lines 146 that are operatively coupled to the compartment by a like number of ports 147. Clamps 148 may be configured to selectively pinch each fluid line 146 so that liquids in the compartment are unable to escape during centrifugation. The bag 144 may comprise two overlying sheets that are bonded together to form a seam line that encircles the compartment. The seam line may be formed using any suitable technique, such as heat welding. The one or more ports 147 may be bonded between the sheets so as to form a sealed connection.

Each sheet from which the bag 144 is formed may comprise a flexible, water impermeable polymeric film, such as a low-density polyethylene. The film may include one or more layers that are either sealed together or separated to form a double wall biobag. For embodiments in which the layers are sealed together, the biobag material may comprise a laminated or extruded material. Laminated material may be formed by bonding two or more separately formed layers using heat, an adhesive, or any other suitable process for bonding layers.

One example of an extruded material that may be used to manufacture biobags is Thermo Scientific CX3-9 film, which is available from Thermo Fisher Scientific of Logan, Utah. The biobag material may be a material approved for direct contact with living cells and capable of maintaining the sterility of a sterile solution. Biobags are also described in detail by Intl. Pub. No. WO 2019/166998, which is incorporated by reference above.

The fluid line 146 may be part of a manifold system (not shown) that is used to add or remove liquids from the processing container 142. The processing container 142 may be filled with a biological suspension prior to placing the processing container 142 into the adapter 18, or after the processing container 142 has been placed into the adapter 18. Likewise, the supernatant or pellet may be decanted from the processing container 142 while the processing container 142 is still in the adapter 18 after centrifugation, or the processing container 142 may be removed from the adapter 18 prior to decanting the supernatant or pellet. Filling/decanting may also occur while the adapters 18 are in the rotor body 22.

Placing each processing container 142 into its respective adapter 18 when empty, and removing it from the adapter 18 with only the pellet may facilitate loading and unloading the adapters 18, and allow the use of larger processing containers. To facilitate filling/emptying the processing containers while in the adapters 18, one or more adapters 18 may be supported by a rack having curved surfaces configured to support the outer wall 80 of each adapter 18 being filled/emptied. The rack may be configured so that the inner opening 82 of each adapter 18 in the rack faces upwardly and the outer wall 80 faces downwardly. The rack may hold multiple adapters 18 each containing an empty processing container 142 so that the processing containers 142 can be filled concurrently, e.g., through a manifold connected to a bioreactor or other source of suspension.

After centrifugation, the same or a similar rack may be used to withdraw supernatant from the processing container 142 within each container adapter 18. To this end, the adapter 18 may be pulled upwardly from the rotor 10 and then tilted (e.g., 90 degrees) until the outer wall 80 is aligned with a receptacle in the rack, and the inner opening 82 is in a position (e.g., facing upward) that facilitates removal of the supernatant. Once aligned with the receptacle, the adapter 18 may be placed into the rack. Supernatant may be pumped out of the processing container 142 until most of the supernatant has been removed so that the pellet is concentrated along the interior surface of the processing container 142 adjacent to the outer wall 80 of adapter 18. Once the pellet has been concentrated, most or all of the remaining supernatant may be removed using a clamp, plus gravity. Alternatively, air may be introduced into the processing container 142 (e.g., from a compressor) to expel the remaining supernatant from each processing container 142. The manifold used to fill the processing containers 142 may be decoupled from the processing containers 142 prior to centrifugation, and then reconnected to decant supernatant from one or more processing containers 142 into a common collection bag after centrifugation. In another embodiment, the manifold used to fill the processing containers 142 may be left in place during centrifugation, and then later used to remove supernatant.

Leaving the manifold in place may facilitate filling and removing fluids from the processing containers 142 during batch processing. For example, supernatant may be removed, and fresh suspension added to the processing containers 142 between periods of centrifugation. Advantageously, this feature may allow multiple batches of suspension (e.g., 15 batches for suspensions that produce small pellets) to be processed in the same processing containers 142 until the pellet occupies a large portion (e.g., 70%) of the capacity of the processing container 142. The processing container 142 and adapter 18 may be configured to contain any desired volume of biological suspension, with a typical volume being about six liters. The filling and decanting of bags used in centrifuges is described in detail in Intl. Pub. No. WO 2019/166998, published Sep. 6, 2019, the disclosure of which is incorporated by reference herein in its entirety.

In applications for which the desired materials are found primarily or exclusively in the supernatant, the biobag with cell material may be discarded once the supernatant has been removed. In other applications, once the supernatant has been withdrawn, an aqueous buffer may be added to the biobag to resuspend the cells. The resuspended cells in the buffer may then be withdrawn from the biobag, e.g., using gravity.

Figure 5:
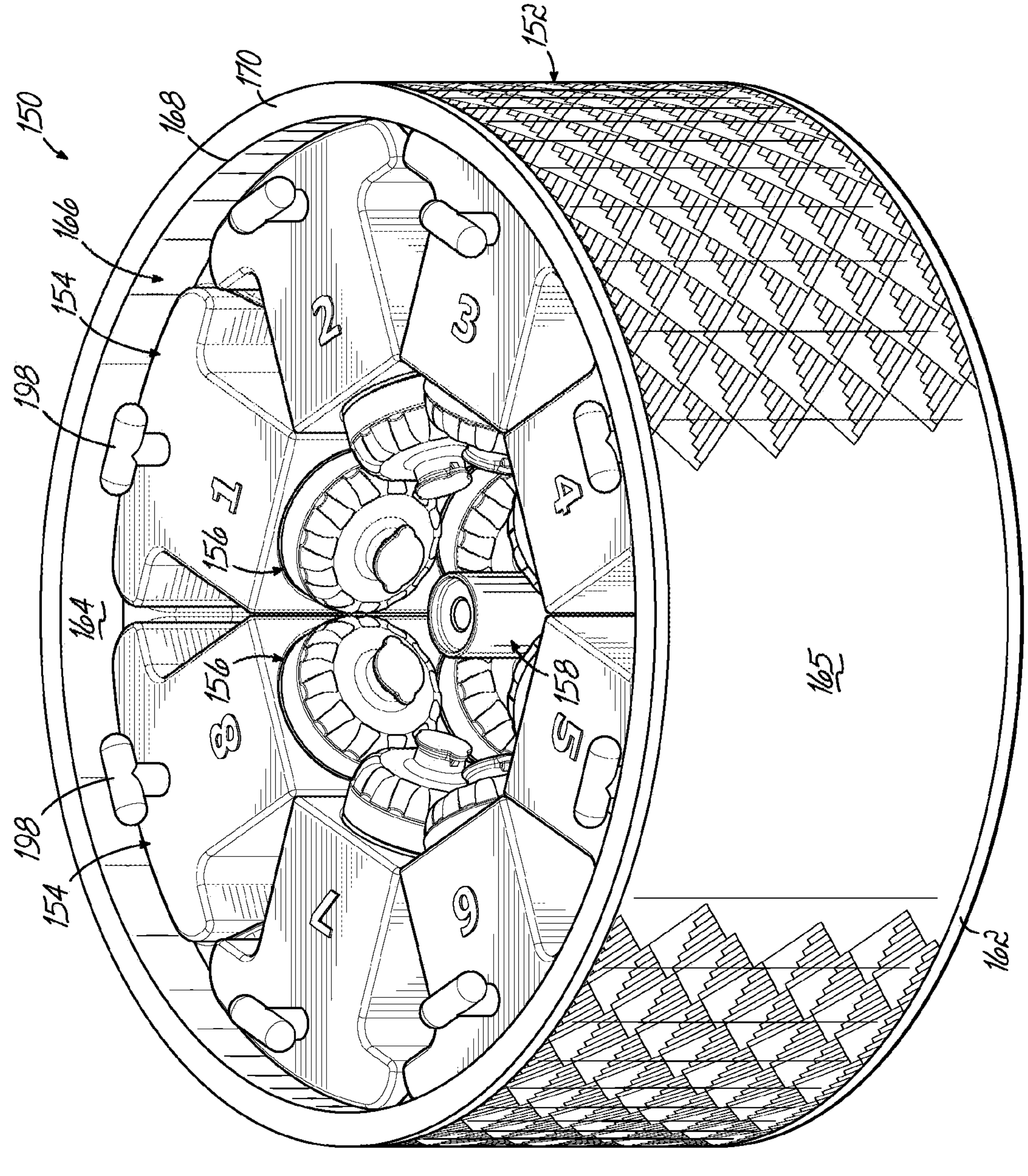
FIG. 5 is a perspective view of a centrifuge rotor in accordance with yet another embodiment of the present invention.
Figure 6:
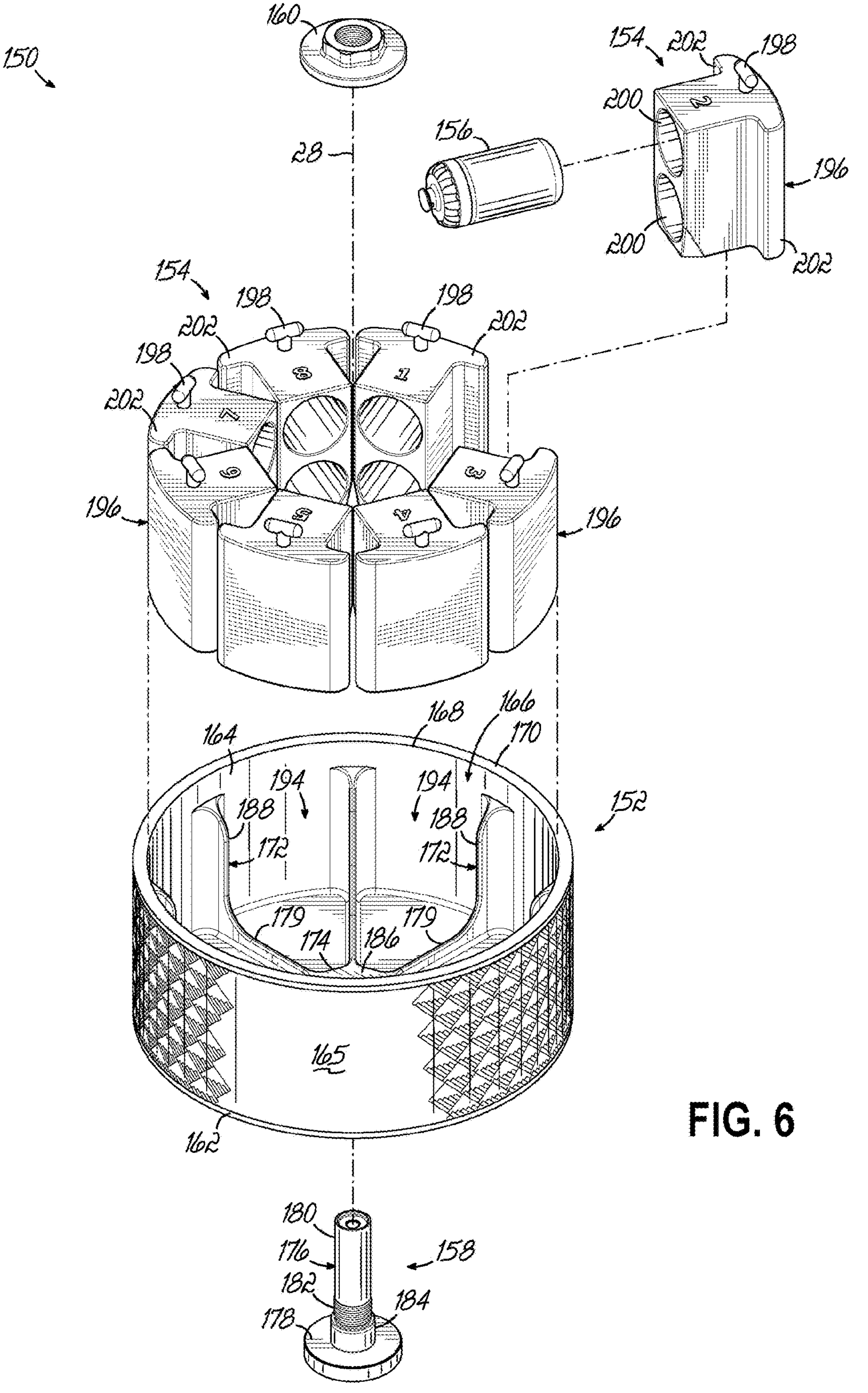
FIG. 6 is a partially disassembled perspective view of the centrifuge rotor of FIG. 5.
Figure 7:
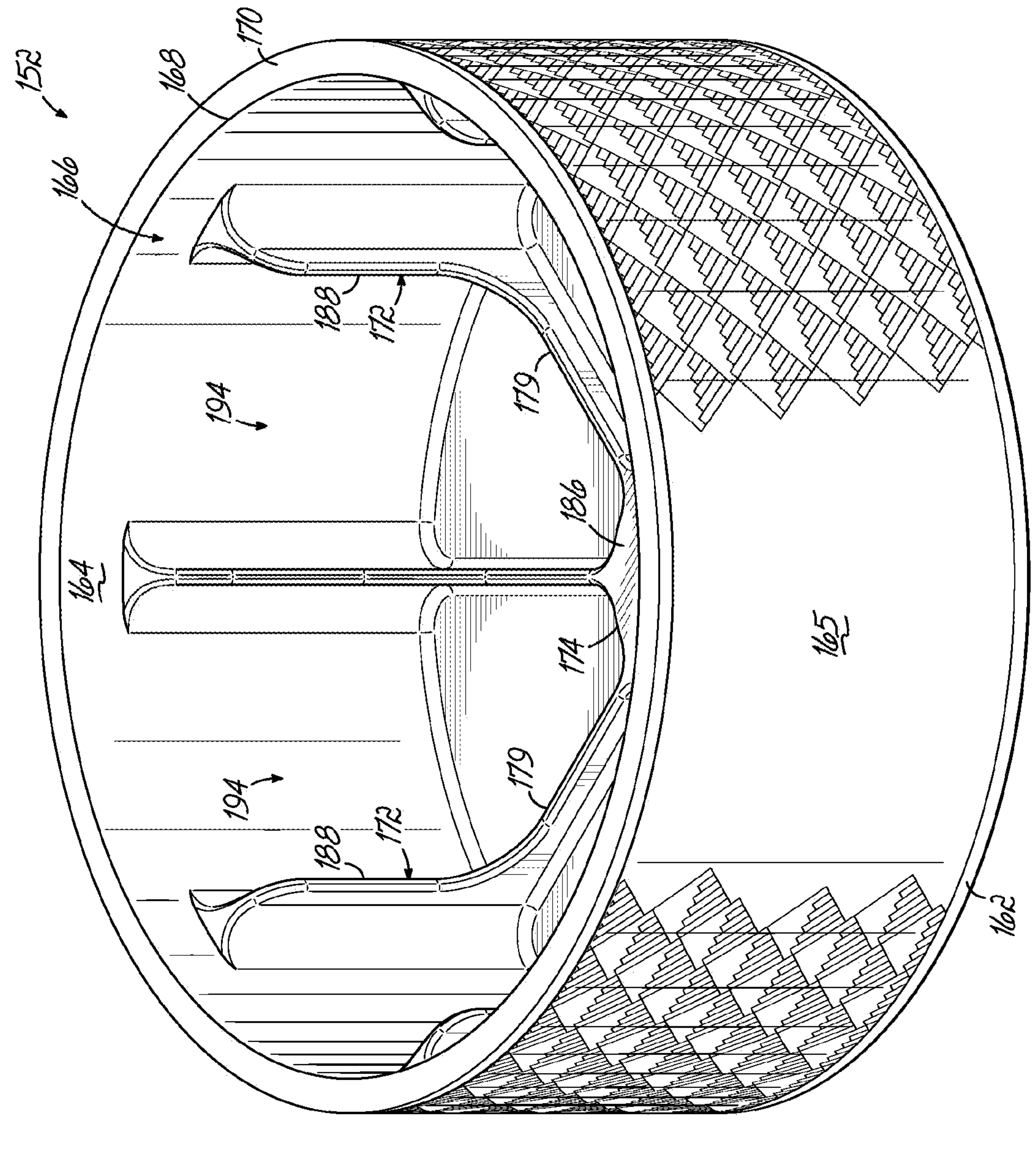
FIG. 7 is a perspective view of a body of the centrifuge rotor of FIGS. 5 and 6.

FIGS. 5-7 depict a rotor 150 in accordance with an alternative embodiment of the present invention. The rotor 150 includes a rotor body 152 configured to receive a plurality of adapters 154 each configured to hold one or more processing containers 156 (e.g., bottles), a drive hub 158, and a retaining nut 160. Processing bottles are described in detail by U.S. Pat. No. 8,215,508, issued Jul. 10, 2012, the disclosure of which is incorporated by reference herein in its entirety.

The rotor body 152 includes a generally circular base 162 and a circumferential sidewall 164 that define a chamber 166 having an upward-facing opening 168. The sidewall 164 may include a reinforcement 165 (e.g., a carbon fiber winding or the like), a radially outwardly-facing surface, and a rim 170 that defines the perimeter of the opening 168. The rotor body 152 may further include a center hole (not shown) in the base 162, a plurality of torque transfer members 172, and a torque transfer ring 174 that projects upward from the base 162 and is axially-aligned with the center hole.

The drive hub 158 includes a hub shaft 176 that extends upward from a drive hub flange 178. The hub shaft 176 may be cylindrical, and include a top portion 180, a threaded portion 182, a lower portion 184, and a tapered bore (not shown) configured to receive the spindle of the centrifuge. The lower portion 184 of hub shaft 176 may be configured to engage the center hole of base 162 and an inner bore of torque transfer ring 174 such that the rotor 10 is axially-aligned with the spindle of the centrifuge when the drive hub 158 is engaged therewith.

The torque transfer ring 174 includes a top surface 186 configured to engage a bottom surface of the retaining nut 160 so that the rotor body 152 is securely fastened to the drive hub 158 when the retaining nut 160 is threadedly engaged with the threaded portion 182 of hub shaft 176. When the retaining nut 160 is tightened, a bottom surface thereof presses against the top surface 186 of torque transfer ring 174, and an upper surface of drive hub flange 178 presses against a bottom surface of base 162 to provide an axial compressive force that secures the rotor body 152 between the retaining nut 160 and drive hub flange 178.

The torque transfer members 172 may operate to transfer torque transmitted through the torque transfer ring 174 from the spindle of the centrifuge to the rotor body 152 and adapters 154. In a similar manner as described above, the torque transfer members 172 may be integral with the rotor body 152 such that the base 162, sidewall 164, torque transfer members 172, and torque transfer ring 174 are formed from a single piece of material, e.g., using a molding process.

Each torque transfer member 172 of rotor body 152 includes a radially-aligned rib 179 that extends radially from the torque transfer ring 174 toward the sidewall 164, and an axially-aligned rib 188 that extends axially upward from the base 162 toward the opening 168. The radially-aligned ribs 179 may include an arcuate taper having a wide end and a narrow end, and may be joined to an upper surface of the base 162 by the wide end of the taper. The axially-aligned ribs 188 may also include an arcuate taper having a wide end and a narrow end, and may be joined to a radially inwardly-facing surface of the sidewall 164 by the wide end of the taper.

The torque transfer members 172 may define a plurality of circumferentially-spaced receptacles 194 (e.g., eight receptacles) each configured to accept a corresponding adapter 154. The arcuate tapers of the radially and axially-aligned ribs 179, 188 may provide a smooth transition between the torque transfer members 172 and the adjoining surfaces of the rotor body 152, and may also allow for the adapters 154 to be placed in and removed from their respective receptacles 194 using an axial motion.

Each adapter 154 includes a generally rectangular shaped adapter body 196 and an adapter handle 198 that provides a grip. The adapter handle 198 may project upwardly from the adapter body 196. The adapter handle 198 may thereby facilitate placing the adapters 154 into and removing the adapters 154 from the rotor body 152. The adapter body 196 may include one or more (e.g., two) radially inwardly-facing cavities 200, and two opposing and circumferentially extending lobes 202 each configured to engage the adjoining axially-aligned rib 188. The lobes 202 may have a radius of curvature that matches that of the arcuate taper of the axially-aligned ribs 188. The lobes 202 may thereby be configured to engage the axially-aligned ribs 188 so as to prevent the adapter 154 from shifting radially or circumferentially during centrifugation.

Each of the radially inwardly-facing cavities 200 may be oriented in a generally horizontal direction and configured to receive a processing container 156. The processing containers 156 may be loaded into the adapter 154 while the adapter 154 is outside the rotor 150. The ability to load processing containers 156 into the adapter 154 while the adapter 154 is outside the rotor 150 may allow the distance between the axis-facing end of the processing container 156 and the drive hub 158 to be reduced as compared to a rotor in which the processing containers 156 are inserted into the rotor directly.

While the present invention has been illustrated by the description of specific embodiments thereof, and while the embodiments have been described in considerable detail, it is not intended to restrict or in any way limit the scope of the appended claims to such detail. The various features discussed herein may be used alone or in any combination. Additional advantages and modifications will readily appear to those skilled in the art. The present invention in its broader aspects is therefore not limited to the specific details, representative apparatus and methods and illustrative examples shown and described. Accordingly, departures may be made from such details without departing from the scope or spirit of the general inventive concept.

What is claimed is:

1. A rotor for a centrifuge, comprising:

a rotor body including a plurality of receptacles spaced circumferentially about an axis of rotation of the rotor body, each of the receptacles of the rotor body being defined by a circumferential sidewall of the rotor body, a centrally located torque transfer ring and a respective pair of circumferentially spaced torque transfer members extending between the torque transfer ring and the circumferential sidewall of the rotor body;

a rotor liner including a plurality of circumferentially spaced receptacles, each receptacle of the rotor liner being configured to be located within a respective one of the plurality of receptacles of the rotor body; and a plurality of adapters, each adapter being removably supported within a respective one of the plurality of receptacles of the rotor body and each adapter being configured to receive a respective processing container within the adapter.

2. The rotor of claim 1, wherein each of the adapters and each of the receptacles of the rotor body is configured so that the adapter is insertable into and removable from a respective receptacle of the rotor body in an axial direction.

3. The rotor of claim 1, wherein each of the adapters and each of the receptacles of the rotor liner is configured so that the adapter is insertable into and removable from a respective receptacle of the rotor liner in an axial direction.

4. The rotor of claim 1, wherein the rotor liner further comprises a plurality of circumferentially spaced pockets, each pocket being located between an adjacent pair of the plurality of receptacles of the rotor liner.

5. The rotor of claim 4, wherein at least one of the plurality of torque transfer members is located within at least one of the plurality of pockets of the rotor liner.

6. The rotor of claim 4, wherein each of the plurality of torque transfer members is located within a respective one of the plurality of pockets of the rotor liner.

7. The rotor of claim 1, wherein each of the plurality of receptacles of the rotor liner is wedge shaped.

8. The rotor of claim 1, further comprising:

a carbon fiber reinforcement provided about the circumferential sidewall of the rotor body.

9. The rotor of claim 1, wherein each of the torque transfer members comprises a radially-aligned rib and an axially-aligned rib.

10. The rotor of claim 9, wherein each axially-aligned rib includes a first arcuate taper having a wide end and a narrow end, with each axially-aligned rib being joined to a radially inwardly-facing surface of the circumferential sidewall by the wide end of the first arcuate taper.

11. The rotor of claim 9, wherein each of the plurality of radially-aligned ribs extends from a radially outwardly-facing surface of the torque transfer ring to a respective one of the axially-aligned ribs.

12. The rotor of claim 9, wherein the rotor body includes a base having an upper surface and each of the radially-aligned ribs extends upwardly from the upper surface of the base.

13. The rotor of claim 12, wherein each of the radially-aligned ribs includes a second arcuate taper having a wide end and a narrow end, with each radially-aligned rib being joined to the upper surface of the base by the wide end of the second arcuate taper.

14. The rotor of claim 1, wherein each of the plurality of adapters includes an outer wall, an inner opening, a pair of opposite sidewalls, a top wall, and a bottom wall that define an open-faced cavity configured to receive the respective processing container within the adapter.

15. The rotor of claim 14, wherein a circumferential length of the outer wall is greater than the circumferential length of the inner opening.

16. The rotor of claim 1, wherein each of the adapters is wedge shaped.

17. The rotor of claim 1, further comprising:

at least one processing container received within a respective adapter.

18. The rotor of claim 17, wherein the processing container comprises one of a biobag or a processing bottle.

19. The rotor of claim 1, wherein each of the plurality of adapters is generally rectangular shaped and includes two oppositely and circumferentially extending lobes.

20. The rotor of claim 19, wherein each adapter further comprises:

at least one horizontally oriented cavity configured to receive a processing container.

21. The rotor of claim 1, wherein each adapter further comprises:

a handle configured to provide a grip that facilitates placing the adapter into one of the plurality of receptacles of the rotor body.

22. The rotor of claim 21 wherein the handle projects upwardly from the adapter.

23. The rotor of claim 21 further comprising:

a lid including a bottom surface having a plurality of cavities each configured to accommodate an adapter handle.

24. A rotor for a centrifuge, comprising:

a rotor body including a plurality of receptacles spaced circumferentially about an axis of rotation of the rotor body, each of the receptacles of the rotor body being defined by a circumferential sidewall of the rotor body, a centrally located torque transfer ring and a respective pair of circumferentially spaced torque transfer members extending between the torque transfer ring and the circumferential sidewall of the rotor body;

a plurality of adapters, each adapter being removably supported within a respective one of the plurality of receptacles of the rotor body and each adapter being configured to receive a respective processing container within the adapter, wherein an adapter comprises a plurality of walls that define an open-faced cavity configured to receive the processing container, the plurality of walls including an outer wall opposite an inner opening of the adapter, wherein the outer wall includes a radially inwardly-facing surface having an axially-aligned curved taper, wherein the plurality of walls includes the outer wall, a first sidewall, a second sidewall opposite the first sidewall, a top wall, and a bottom wall opposite the top wall, and wherein the axially-aligned curved taper is provided by a progressively increasing thickness of the outer wall as the outer wall extends from the bottom wall to the top wall.

25. The rotor of claim 24, wherein the outer wall, the first sidewall, the second sidewall, the top wall, and the bottom wall are operatively coupled together to define the inner opening opposite the outer wall that provides access to the cavity.

26. The rotor of claim 25, wherein the first sidewall and the second sidewall have a radial length such that, when the adapter is placed in the receptacle, the inner opening is offset radially toward the outer wall from an inner wall of the receptacle.

27. The rotor of claim 24, wherein the first sidewall and the second sidewall are oriented at an angle that, when multiplied by the number of receptacles in the centrifuge rotor, equals 360 degrees.

28. The rotor of claim 27, wherein the angle between the first sidewall and the second sidewall provide the adapter with a wedge shape.

29. The rotor of claim 24, wherein the top wall and the bottom wall are parallel to each other.

30. The rotor of claim 24, wherein the receptacle is provided by a rotor liner of the centrifuge rotor.

31. The rotor of claim 24, wherein the processing container is a biobag.

32. The rotor of claim 24, further comprising:

a handle configured to provide a grip that facilitates placing the adapter into one of the plurality of receptacles of the rotor body.

33. The rotor of claim 32 wherein the handle projects upwardly from the adapter.

34. The rotor of claim 32, wherein the axially-aligned curved taper works in conjunction with centrifugal force generated by rotating the centrifuge rotor to cause suspended solids to collect in a portion of the processing container proximate the bottom wall.

35. The rotor of claim 24, wherein the cavity is one of a plurality cavities each configured to receive one of a plurality of processing containers.

36. The rotor of claim 24, wherein the cavity faces radially inward.

37. The rotor of claim 24, wherein the cavity is oriented in a horizontal direction.

38. The rotor of claim 24, wherein each receptacle is at least partially defined by a plurality of axially-aligned ribs, and the adapter includes a plurality of opposing and circumferentially extending lobes that engage the axially-aligned ribs.

39. The rotor of claim 38, wherein each of the axially-aligned ribs has an arcuate taper, and each lobe has a radius of curvature that matches the radius of curvature of the arcuate taper of the axially-aligned ribs.

40. A rotor for a centrifuge, comprising:

a rotor body including a plurality of receptacles spaced circumferentially about an axis of rotation of the rotor body, each of the receptacles of the rotor body being defined by a circumferential sidewall of the rotor body, a centrally located torque transfer ring and a respective pair of circumferentially spaced torque transfer members extending between the torque transfer ring and the circumferential sidewall of the rotor body;

a plurality of adapters, each adapter being removably supported within a respective one of the plurality of receptacles of the rotor body and each adapter being configured to receive a respective processing container within the adapter, wherein an adapter comprises a plurality of walls that define an open-faced cavity configured to receive the processing container, the plurality of walls including an outer wall opposite an inner opening of the adapter, wherein the outer wall includes a radially inwardly-facing surface having an axially-aligned curved taper, and wherein the plurality of walls further includes a top wall and a bottom wall, and the axially-aligned curved taper is provided by a progressively increasing thickness of the outer wall as the outer wall extends from the bottom wall to the top wall.

41. The rotor of claim 40, further comprising: a handle operatively coupled to the top wall of the adapter.

42. The rotor of claim 41, wherein the handle projects upwardly from the top wall of the adapter.

* * * * *